US010906101B2

(12) United States Patent
Weaver et al.

(10) Patent No.: US 10,906,101 B2
(45) Date of Patent: Feb. 2, 2021

(54) SYSTEMS AND METHODS FOR ADDITIVE MANUFACTURING POWDER ASSESSMENT

(71) Applicant: General Electric Company, Schenectady, NY (US)

(72) Inventors: Scott Andrew Weaver, Ballston Lake, NY (US); Anthony Joseph Vinciquerra, Rexford, NY (US)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 15/866,223

(22) Filed: Jan. 9, 2018

(65) Prior Publication Data

US 2019/0210108 A1 Jul. 11, 2019

(51) Int. Cl.
*B22F 3/105* (2006.01)
*G06Q 10/06* (2012.01)
*G07C 3/14* (2006.01)
*B33Y 50/00* (2015.01)
*B33Y 40/00* (2020.01)
*B33Y 10/00* (2015.01)
*B33Y 99/00* (2015.01)
*G01N 3/08* (2006.01)

(52) U.S. Cl.
CPC .......... *B22F 3/1055* (2013.01); *G07C 3/146* (2013.01); *B22F 2003/1057* (2013.01); *B33Y 10/00* (2014.12); *B33Y 40/00* (2014.12); *B33Y 50/00* (2014.12); *B33Y 99/00* (2014.12); *G01N 3/08* (2013.01); *G01N 2203/0284* (2013.01); *G06Q 10/06395* (2013.01); *Y02P 10/25* (2015.11)

(58) Field of Classification Search
CPC .......... B22F 3/1055; B22F 2003/1057; G07C 3/146; G06Q 10/06395; B33Y 50/00; B33Y 40/00; B33Y 10/00; B33Y 99/00; G01N 3/08; G01N 19/00; G01N 9/36; G01N 2203/0284; Y02P 10/25
See application file for complete search history.

(56) References Cited

U.S. PATENT DOCUMENTS 4,680,958 A * 7/1987 Ruelle ..................... B29C 48/92
  73/54.14
5,352,405 A * 10/1994 Beaman ................ B22F 3/1055
  419/45

(Continued)

FOREIGN PATENT DOCUMENTS

CN 204807421 U 11/2015

OTHER PUBLICATIONS

Dietrich et al., "A New Approach For A Flexible Powder Production For Additive Manufacturing", 16th Machining Innovations Conference for Aerospace Industry—MIC 2016, vol. 06, pp. 88-95, 2016.

(Continued)

*Primary Examiner* — Frederick C Nicolas
(74) *Attorney, Agent, or Firm* — Dority & Manning, P.A.

(57) ABSTRACT

A powder quality control system includes a powder container, a piston, and at least one sensor. The powder container is configured to contain a powder sample. The piston is configured to compact the powder sample in the powder container. The at least one sensor is configured to measure at least one parameter when the piston compacts the powder sample to facilitate determining a powder quality measurement for the powder sample.

16 Claims, 5 Drawing Sheets

(56) References Cited

U.S. PATENT DOCUMENTS

| | | | |
|---|---|---|---|
| 7,887,316 B2 | 2/2011 | Cox | |
| 8,464,592 B2 * | 6/2013 | Hirtt | G01N 1/286 |
| | | | 73/818 |
| 9,557,315 B2 * | 1/2017 | Kats | G01N 33/383 |
| 10,295,502 B2 * | 5/2019 | Clavette | B33Y 40/00 |
| 10,328,636 B2 * | 6/2019 | Versluys | B29C 64/20 |
| 2011/0079087 A1 * | 4/2011 | Hirtt | G01N 3/08 |
| | | | 73/818 |
| 2016/0368056 A1 | 12/2016 | Swaminathan et al. | |
| 2017/0038342 A1 | 2/2017 | Clavette et al. | |
| 2017/0120529 A1 | 5/2017 | DeMuth et al. | |
| 2017/0136695 A1 | 5/2017 | Versluys et al. | |
| 2017/0136702 A1 | 5/2017 | Giulietti et al. | |
| 2017/0232515 A1 | 8/2017 | Demuth et al. | |
| 2017/0355143 A1 * | 12/2017 | Speckmann | G01N 21/00 |
| 2019/0111621 A1 * | 4/2019 | Weaver | B33Y 30/00 |

OTHER PUBLICATIONS

International Search Report and Written Opinion, dated Apr. 10, 2019, for related International application No. PCT/US2018/066112 (13 pgs.).

* cited by examiner

SYSTEMS AND METHODS FOR ADDITIVE MANUFACTURING POWDER ASSESSMENT

BACKGROUND

The field of the disclosure relates generally to additive manufacturing systems, and more particularly, to systems and methods for assessing powder used in additive manufacturing systems.

At least some additive manufacturing systems involve the buildup of a powder material to make a component. This method can produce complex components from expensive materials at a reduced cost and with improved manufacturing efficiency. At least some known additive manufacturing systems, such as Direct Metal Laser Melting (DMLM) systems, fabricate components using a laser device, a build plate, and a powder material, such as, without limitation, a metal powder. The laser device generates a laser beam that melts the powder material on the build plate in and around the area where the laser beam is incident on the powder material, resulting in a melt pool. The powder material is typically stored in barrels. If the barrel is stored for too long or in an environment that is adverse to the powder, some of the powder may degrade and sift to the bottom of the barrel. As the powder within the barrel is depleted through use in a DMLM system, the quality of the powder at the bottom of the barrel degrades. Accordingly, test mechanisms are needed to assess the quality of stored powder for use in additive manufacturing systems.

BRIEF DESCRIPTION

In one aspect, a powder quality control system is provided. The powder quality control system includes a powder container, a piston, and at least one sensor. The powder container is configured to contain a powder sample. The piston is configured to compact the powder sample in the powder container. The at least one sensor is configured to measure at least one parameter when the piston compacts the powder sample to facilitate determining a powder quality measurement for the powder sample.

In another aspect, an additive manufacturing system is provided. The additive manufacturing system includes a laser device, a build plate, and a powder quality control system. The laser device is configured to generate a laser beam. The build plate is configured to contain a powdered build material. The laser beam is configured to generate a melt pool from the powdered build material. The powder quality control system configured to determine a powder quality measurement of the powdered build material prior to generating the melt pool.

In yet another aspect, a method of testing a powdered build material for use in an additive manufacturing system is provided. The method includes loading a powder sample of the powdered build material into a powder container of a powder quality control system. The powder quality control system includes the powder container, a piston, and at least one sensor. The method also includes compacting the powder sample using the piston, the piston travelling a predetermined distance. The method further includes measuring, once the piston has travelled the predetermined distance, at least one parameter using the at least one sensor. The method also includes determining a powder quality measurement for the powder sample based on the at least one parameter.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

Embodiments of additive manufacturing systems with a powder quality control system are described herein. The additive manufacturing system includes a powder quality control system including a powder container, a piston, a load cell, and a linear variable displacement transducer. A powder sample is loaded into the powder container and the piston compacts the powder sample. While the powder sample is being compacted, the load cell measures the change in load and the linear variable displacement transducer measures the change in distance travelled by the piston. A powder quality measurement is calculated based on the change in load and the change in distance travelled by the linear variable displacement transducer. If the powder sample meets or exceeds a minimum quality threshold, the powder material is loaded into the additive manufacturing system to manufacture a part or component. However, if the does not meet or exceed the minimum quality threshold, the manufacturing process is paused for further assessment.

Figure 1:
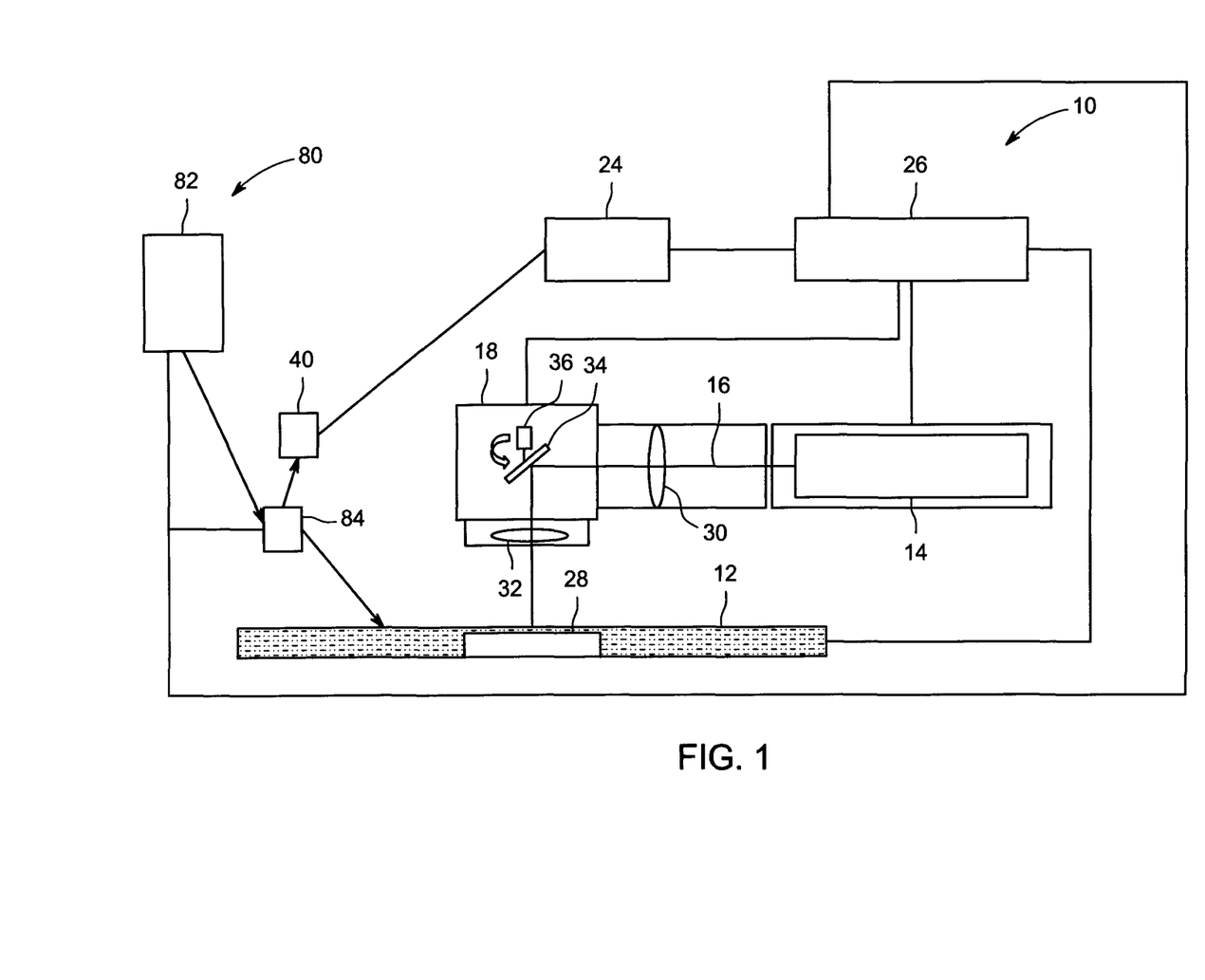
FIG. 1 is a schematic view of an exemplary additive manufacturing system shown in the form of a direct metal laser melting (DMLM) system including a powder quality control system.

FIG. 1 is a schematic view of an exemplary additive manufacturing system 10 illustrated in the form of a direct metal laser melting (DMLM) system. Although the embodiments herein are described with reference to a DMLM system, this disclosure may also apply to other types of additive manufacturing systems, such as selective laser sintering systems.

In the exemplary embodiment, DMLM system 10 includes a build plate 12, a laser device 14 configured to generate a laser beam 16, a first scanning device 18 configured to selectively direct laser beam 16 across build plate 12, a powder quality control system 40 configured to assess the quality of powder available for use in DMLM system 10, and, optionally, a powder distribution system 80. The exemplary DMLM system 10 also includes a computing device 24 and a controller 26 configured to control one or more components of DMLM system 10, as described in more detail herein.

Build plate 12 includes a powdered build material that is melted and re-solidified during the additive manufacturing process to build a solid component 28. The powdered build material includes materials suitable for forming such components, including, without limitation, gas atomized alloys of cobalt, iron, aluminum, titanium, nickel, and combinations thereof. In other embodiments, the powdered build material may include any suitable type of powder metal material. In yet other embodiments, the powdered build material may include any suitable build material that enables DMLM system 10 to function as described, including, for example and without limitation, ceramic powders, metal-coated ceramic powders, and thermoset or thermoplastic resins.

Laser device 14 is configured to generate a laser beam 16 of sufficient energy to at least partially melt the build material of build plate 12. In the exemplary embodiment, laser device 14 is a yttrium-based solid state laser configured to emit a laser beam having a wavelength of about 1070 nanometers (nm). In other embodiments, laser device 14 may include any suitable type of laser that enables DMLM system 10 to function as described herein, such as a $CO_2$ laser. Further, although DMLM system 10 is shown and described as including a single laser device 14, DMLM system 10 may include more than one laser device. In one embodiment, for example, DMLM system 10 may include a first laser device having a first power and a second laser device having a second power different from the first laser power, or at least two laser devices having substantially the same power output. In yet other embodiments, DMLM system 10 may include any combination of laser devices that enable DMLM system 10 to function as described herein.

As shown in FIG. 1, laser device 14 is optically coupled to optical elements 30 and 32 that facilitate focusing laser beam 16 on build plate 12. In the exemplary embodiment, optical elements 30 and 32 include a beam collimator 30 disposed between the laser device 14 and first scanning device 18, and an F-theta lens 32 disposed between the first scanning device 18 and build plate 12. In other embodiments, DMLM system 10 may include any suitable type and arrangement of optical elements that provide a collimated and/or focused laser beam on build plate 12.

First scanning device 18 is configured to direct laser beam 16 across selective portions of build plate 12 to create solid component 28. In the exemplary embodiment, first scanning device 18 is a galvanometer scanning device including a mirror 34 operatively coupled to a galvanometer-controlled motor 36 (broadly, an actuator). Motor 36 is configured to move (specifically, rotate) mirror 34 in response to signals received from controller 26, and thereby deflect laser beam 16 across selective portions of build plate 12. Mirror 34 may have any suitable configuration that enables mirror 34 to deflect laser beam 16 towards build plate 12. In some embodiments, mirror 34 may include a reflective coating that has a reflectance spectrum that corresponds to the wavelength of laser beam 16.

Although first scanning device 18 is illustrated with a single mirror 34 and a single motor 36, first scanning device 18 may include any suitable number of mirrors and motors that enable first scanning device 18 to function as described herein. In one embodiment, for example, first scanning device 18 includes two mirrors and two galvanometer-controlled motors, each operatively coupled to one of the two mirrors. In yet other embodiments, first scanning device 18 may include any suitable scanning device that enables DMLM system 10 to function as described herein, such as, for example, two-dimension (2D) scan galvanometers, three-dimension (3D) scan galvanometers, and dynamic focusing galvanometers.

Computing device 24 may be a computer system that includes at least one processor (not shown in FIG. 1) that executes executable instructions to operate DMLM system 10. Computing device 24 may include, for example, a calibration model of DMLM system 10 and an electronic computer build file associated with a component, such as component 28. The calibration model may include, without limitation, an expected or desired melt pool size and temperature under a given set of operating conditions (e.g., a power of laser device 14) of DMLM system 10. The build file may include build parameters that are used to control one or more components of DMLM system 10. Build parameters may include, without limitation, a power of laser device 14, a scan speed of first scanning device 18, and a position and orientation of first scanning device 18 (specifically, mirror 34). In the exemplary embodiment, computing device 24 and controller 26 are shown as separate devices. In other embodiments, computing device 24 and controller 26 may be combined as a single device that operates as both computing device 24 and controller 26 as each are described herein.

Controller 26 may include any suitable type of controller that enables DMLM system 10 to function as described herein. In one embodiment, for example, controller 26 is a computer system that includes at least one processor and at least one memory device that executes executable instructions to control the operation of DMLM system 10 based at least partially on instructions from human operators. Controller 26 may include, for example, a 3D model of component 28 to be fabricated by DMLM system 10. Executable instructions executed by controller 26 may include controlling the power output of laser device 14 and controlling a position and scan speed of first scanning device 18.

Controller 26 is configured to control one or more components of DMLM system 10 based on build parameters associated with a build file stored, for example, within computing device 24. In the exemplary embodiment, controller 26 is configured to control first scanning device 18 based on a build file associated with a component to be fabricated with DMLM system 10. More specifically, controller 26 is configured to control the position, movement, and scan speed of mirror 34 using motor 36 based upon a predetermined path defined by a build file associated with component 28.

Controller 26 may also be configured to control other components of DMLM system 10, including, without limitation, laser device 14. In one embodiment, for example, controller 26 controls the power output of laser device 14 based on build parameters associated with a build file.

In the exemplary embodiment, a high quality powder material is formed of a uniform material with approximately equally sized spherical particles. The high quality material is free from contaminants and the spherical particles are substantially solid such that the particles are not hollow inside. Conversely, a low quality powder material may include contaminants, may be formed of particles with variable shapes and sizes, and/or may include hollow particles capable of collapsing during the melting process.

In the illustrated embodiment, DMLM system 10 includes powder quality control system 40 and powder distribution system 80. Powder quality control system 40 is configured to measure the quality of powdered build material as discussed below. Powder distribution system 80 is configured to provide powdered build material to powder quality control system 40 and build plate 12. Powder distribution system 80 includes a powder storage container 82 and a powder distribution device 84. In the exemplary embodiment, powder storage container 82 includes a barrel. In other embodiments, powder storage container 82 includes any container that enables DMLM system 10 to operate as described herein. In the exemplary embodiment, powder distribution device 84 includes an automated distribution mechanism configured to provide powdered build material from powder storage container 82 to powder quality control system 40 and build plate 12. In other embodiments, powder distribution device 84 is not an automated distribution mechanism, but rather a manual mechanism for providing provide powdered build material from powder storage container 82 to powder quality control system 40 and build plate 12. In yet another embodiment, DMLM system 10 does not include powder distribution device 84. Rather an operator manually transfers powdered build material from powder storage container 82 to powder quality control system 40 and build plate 12.

During operations, computing device 24 initiates the additive manufacturing process by sending a signal to controller 26 to test the quality of the powdered build material. Controller 26 sends a signal to powder distribution device 84 to transport powdered build material from powder storage container 82 to powder quality control system 40. Powder distribution device 84 transports powdered build material to powder quality control system 40 and powder quality control system 40 assesses the quality of the powdered build material as described in detail herein. Powder quality control system 40 reports the quality of the powdered build material to computing device 24 and computing device 24 determines whether the powdered build material is of high enough quality to proceed with the additive manufacturing process. If the quality of powdered build material is too low, computing device 24 stops the additive manufacturing process. If the quality of powdered build material meets or exceeds a threshold, computing device 24 continues the additive manufacturing process by sending a signal to controller 26 to distribute the powdered build material to build plate 12. Controller 26 sends a signal to powder distribution device 84 to transport powdered build material from powder storage container 82 to build plate 12. Powder distribution device 84 transports powdered build material to build plate 12 and the additive manufacturing process begins.

In the illustrated embodiment, each individual DMLM systems 10 includes its own powder quality control system 40 and powder distribution system 80. In other embodiments, powder quality control system 40 and powder distribution system 80 are centralized systems configured to service multiple DMLM systems 10 in a single facility or in multiple adjacent facilities.

Figure 2:
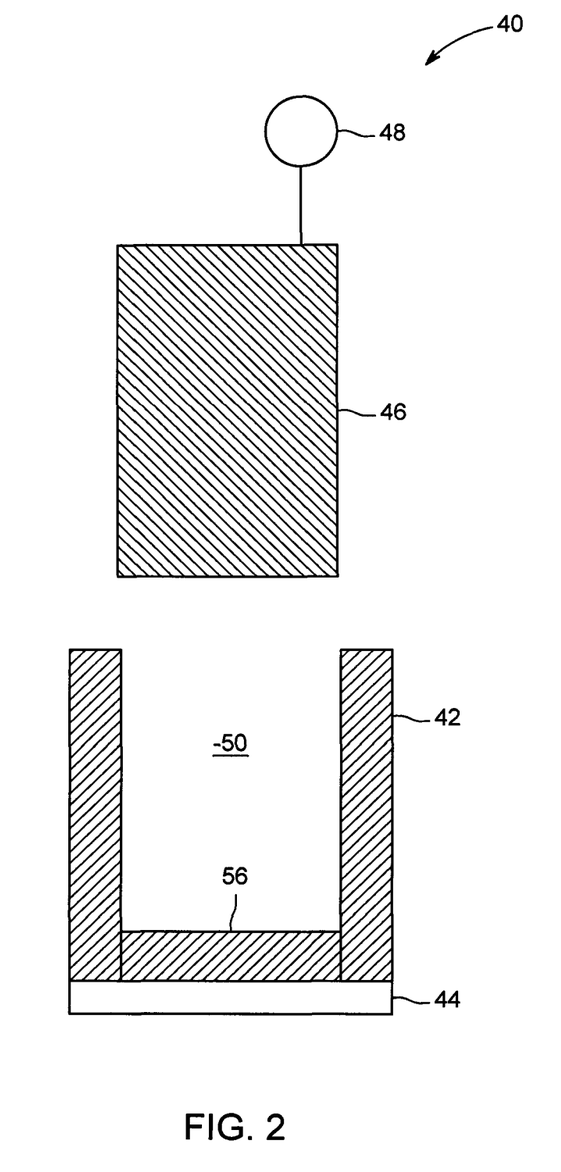
FIG. 2 is a schematic view of the exemplary powder quality control system shown in FIG. 1 illustrated in an open, empty configuration.
Figure 3:
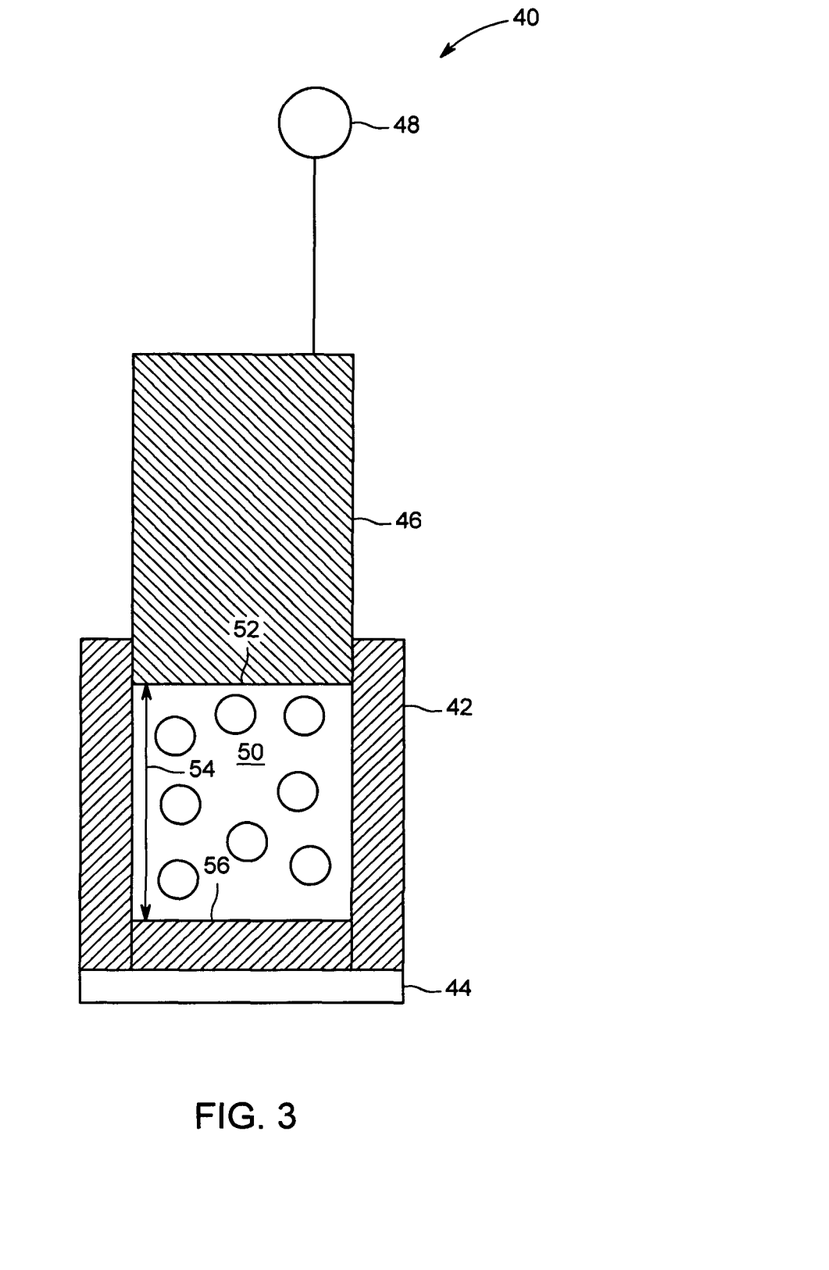
FIG. 3 is a schematic view of the exemplary powder quality control system shown in FIG. 1 illustrated in an open, filled configuration.
Figure 4:
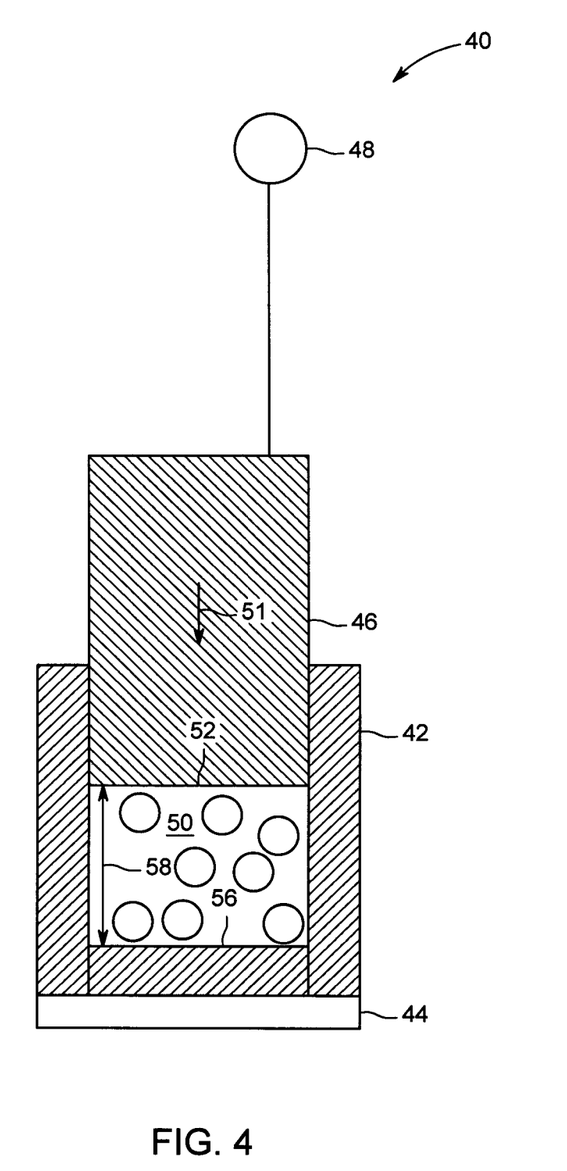
FIG. 4 is a schematic view of the exemplary powder quality control system shown in FIG. 1 illustrated in a closed, filled configuration.

FIG. 2 is a schematic view of an exemplary powder quality control system 40 illustrated in an open, empty configuration. FIG. 3 is a schematic view of exemplary powder quality control system 40 illustrated in an open, filled configuration. FIG. 4 is a schematic view of exemplary powder quality control system 40 illustrated in a closed, filled configuration. Powder quality control system 40 shown in FIGS. 2-4 is a handheld manual powder quality control system 40. Powder quality control system 40 may also be an automated system integral to DMLM system 10 or integral to an additive manufacturing facility as described above. Powder quality control system 40 includes a powder container 42, a load cell 44, a piston 46, and a linear variable displacement transducer (LVDT) 48. Powder container 42 partially defines a compression chamber 50 configured to contain a sample of powder 52 (shown in FIGS. 3 and 4) therein during the assessment process. In the exemplary embodiment, powder container 42 is a metal, cylindrical container. In other embodiments, powder container 42 may include any shape and may be constructed of any material that enables powder quality control system 40 to operate as described herein. In the exemplary embodiment, compression chamber 50 has a cylindrical shape. In other embodiments, compression chamber 50 has any shape that enables powder quality control system 40 to operate as described herein.

Piston 46 is positioned above powder container 42 and has a shape that is complementary to the shape of compression chamber 50. Piston 46 is configured to slide into compression chamber 50 to compact powder sample 52 therein. In the exemplary embodiment, piston 46 is configured to slide into compression chamber 50 with a compaction force 51 (shown in FIG. 4). Powder quality control system 40 also includes a force producing mechanism (not shown) which imparts a force to piston 40. In the exemplary embodiment, force producing mechanism includes an electric motor, a hydraulic jack, or a screw jack.

Powder quality control system 40 includes at least one sensor configured to measure at least one parameter. In the exemplary embodiment, powder quality control system 40 includes two sensors: load cell 44 and LVDT 48. In other embodiments, powder quality control system 40 may include any number of sensors that enable powder quality control system 40 to operate as described herein. Load cell 44 is a load measuring device positioned below powder container 42. Load cell 44 is configured to measure the combined load on powder container 42, powder sample 52, and a second force on powder container 42 and powder sample 52 resulting from piston 46 sliding into compression chamber 50. That is, load cell 44 measures the change in load on powder container 42 and powder sample 52 as a result of piston 46 compacting powder sample 52.

LVDT 48 is an electrical transducer configured to measure a distance traveled by piston 46 as piston 46 slides into compression chamber 50. In the exemplary embodiment, piston 46 is positioned a first, predetermined distance 54 (shown in FIG. 3) above a bottom 56 of powder container 42. As piston 46 slides into compression chamber 50, the distance between piston 46 and bottom 56 of powder container 42 decreases to a second, predetermined distance 58 (shown in FIG. 4). LVDT 48 is configured to measure the difference between first distance 54 and second distance 58.

FIG. 2 shows powder quality control system 40 in an open, empty configuration ready to receive powder sample 52. During operations, powder sample 52 is loaded into the empty compression chamber 50 shown in FIG. 2. Specifically, an operator picks up the powder quality control system 40 and carries it to powder distribution system 80 (a barrel of powdered build material). The operator loads a predetermined amount of powder sample 52 into compression chamber 50.

FIG. 3 shows powder quality control system 40 in an open, filled configuration ready to assess the quality of powder sample 52. Once loaded with powder sample 52, piston 46 is placed on top of powder sample 52. In the exemplary embodiment, load cell 44 and LVDT 48 are both set to zero. In an alternative embodiment, load cell 44 measures a first load that is the combined load of powder container 42 and powder sample 52 and LVDT 48 measures first distance 54. The operator records the first load and first distance 54.

FIG. 4 shows powder quality control system 40 in a closed, filled configuration compacting powder sample 52 and assessing the quality of powder sample 52. Once load cell 44 has measured the combined load on powder container 42 and powder sample 52, piston 46 is slid into compression chamber 50 and powder sample 52 is compacted within compression chamber 50. Force producing mechanism imparts compaction force 51 to piston 46. Piston 46 slides into compression chamber 50 with compaction force 51 and compacts powder sample 52. Piston 46 slides into compression chamber 50 until piston 46 reaches second predetermined distance 58. Second predetermined distance 58 is a known distance based on guidelines and experimentation of known powdered build materials. Once piston 46 has reached second predetermined distance 58, LVDT 48 signals the force producing mechanism to stop and load cell 44 records the load a second load that is the combined load on powder container 42, powder sample 52, and compaction force 51. The operator then records the second load from load cell 44 and compares the second load to a known load for a pedigree powdered build material. If powder sample 52 includes high quality powder, powder sample 52 will only compact a relatively small amount. However, if powder sample 52 includes low quality powder, powder sample 52 will compact a relatively large amount. LVDT 48 measures second distance 58 and load cell 44 measures a second load that is the combined load of powder container 42, powder sample 52, and compaction force 51.

In the exemplary automated embodiment, load cell 44 reports the first load and the second load to the operator or to computing device 24. Once the first and second loads are received, a change in load (ΔP), which is the difference between the first load and the second load, is calculated. Additionally, in the exemplary embodiment, LVDT 48 reports first distance 54 and second distance 58 to a user or to computing device 24. Once first and second distances 54 and 58 are received, a change in length (ΔL), which is the difference between first distance 54 and second distance 58, is calculated. In another embodiment, load cell 44 reports ΔP directly to a user or to computing device 24. Additionally, in another embodiment, LVDT 48 reports ΔL directly to a user or to computing device 24. Computing device 24 then calculates a powder quality measurement based on ΔP and ΔL.

As explained above, a high quality powder sample 52 includes substantially spherical powder metal particles which are substantially solid. That is, the particles do not include voids or hollow regions. Conversely, a low quality powder sample 52 includes irregularly shaped powder metal particles with voids or hollow regions.

When powder quality control system 40 tests a high quality powder sample 52, the substantially solid, spherical particles of powder sample 52 remain intact and compact only a small amount such the voids between particles are reduced. As such, most of compaction force 51 is transferred to load cell 44 and first distance 54 is only slightly longer than second distance 58. Conversely, when powder quality control system 40 a low quality powder sample 52, the irregular, hollow particles of powder sample 52 break and compact. As such, most of compaction force 51 is transferred to compacting the particles of powder sample 52 rather than to load cell 44. Additionally, first distance 54 is only significantly longer than second distance 58. Thus, ΔP of a high quality powder sample 52 is larger than ΔP of a low quality powder sample 52 and ΔL of a high quality powder sample 52 is shorter than ΔL of a low quality powder sample 52.

In one example, the powder quality measurement is the ratio of ΔP to ΔL (ΔP/ΔL), or the load to length ratio. A high quality powder sample 52 has a load to length ratio greater than the load to length ratio of a low quality powder sample 52. In a first example, if the first load is zero, the second load is 1,000 pounds force ($lb_f$), the first distance is zero, and the second distance is 0.001", then the powder quality measurement is 1,000,000, indicating that the powder sample 52 is a higher quality powder because it is difficult to compress. In a second example, if the first load is zero, the second load is 1,000 $lb_f$, the first distance is zero, and the second distance is 0.01", then the powder quality measurement is 100,000, indicating that the powder sample 52 is a lower quality powder because it is easier to compress than the sample in the first example.

Figure 5:
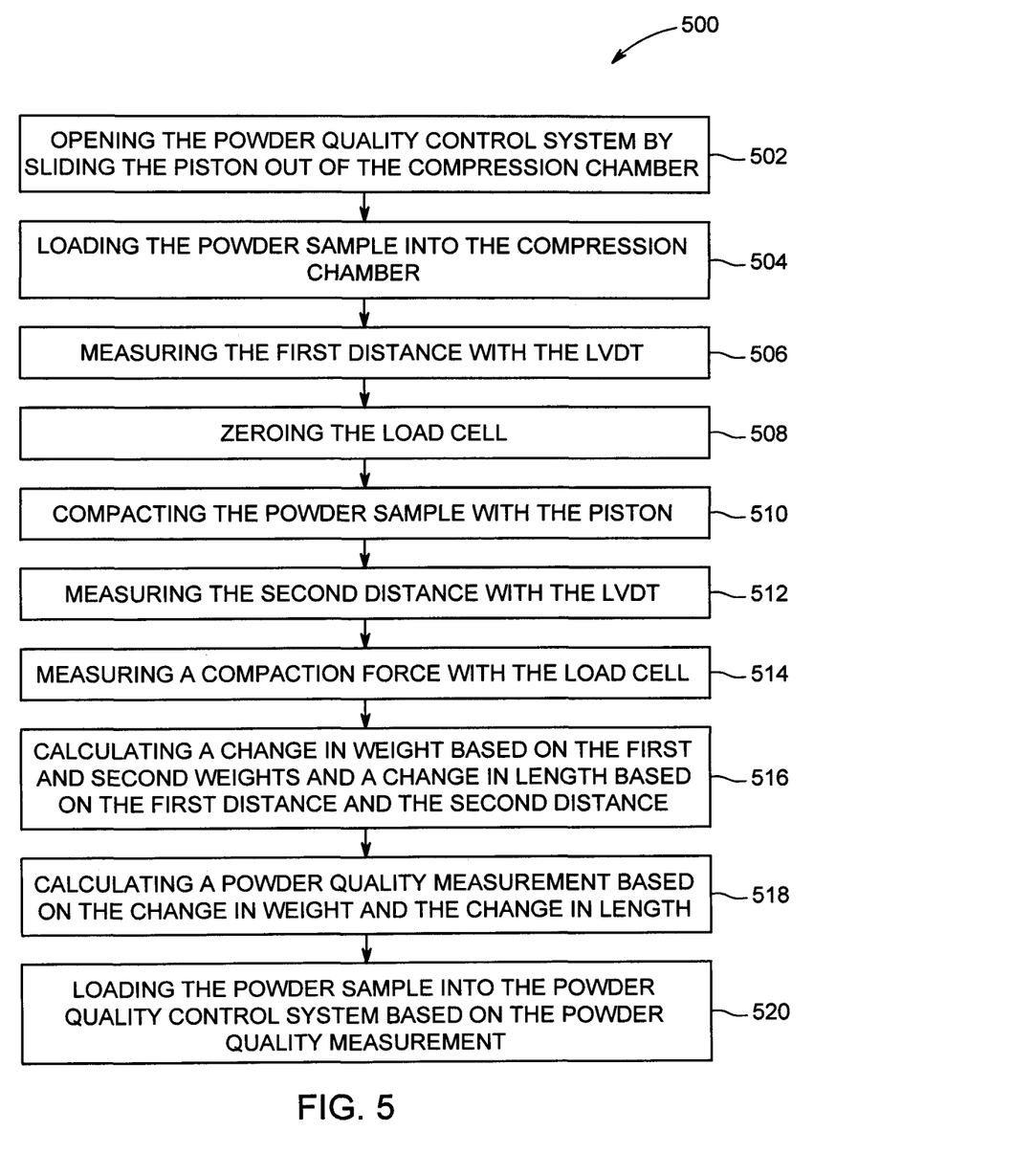
FIG. 5 is a flow diagram of a method of testing a powder material for use in the DMLM system shown in FIG. 1.

FIG. 5 is a flow diagram of a method 500 of testing powder sample 52 for use in DMLM system 10. Method 500 includes opening 502 powder quality control system 40 by sliding piston 46 out of compression chamber 50. Method 500 further includes loading 504 powder sample 52 into compression chamber 50. Method 500 also includes measuring 506 first distance 54 with LVDT 48. Method 500 further includes zeroing 508 the load cell 44. Method 500 also includes compacting 510 powder sample 52 with piston 46. Method 500 further includes measuring 512 second distance 58 with LVDT 48. Method 500 also includes measuring 514 a compaction force with load cell 44. Method 500 further includes calculating 516 a change in load based on the first and second loads and a change in length based on first distance 54 and second distance 58. Method 500 also includes calculating 518 a powder quality measurement based on the change in load and the change in length. Method 500 further includes loading 520 powder sample 52 onto build plate 12 based on the powder quality measurement.

Embodiments of additive manufacturing systems with a powder quality control system are described herein. The additive manufacturing system includes a powder quality control system including a powder container, a piston, a load cell, and a linear variable displacement transducer. A powder sample is loaded into the powder container and the piston compacts the powder sample. While the powder sample is being compacted, the load cell measures the change in load and the linear variable displacement transducer measures the change in distance travelled by the piston. A powder quality measurement is calculated based on the change in load and the change in distance travelled by the linear variable displacement transducer. If the powder sample meets or exceeds a minimum quality threshold, the powder material is loaded into the additive manufacturing system to manufacture a part or component. However, if the does not meet or exceed the minimum quality threshold, the manufacturing process is paused for further assessment.

An exemplary technical effect of the methods and systems described herein includes: (a) testing a powdered build material; (b) calculating a powder quality measurement; and (c) loading a DMLM system with the powdered build material based on the powder quality measurement.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems having a powder quality control system are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A powder quality control system comprising:
   a powder container configured to contain a powder sample;
   a piston configured to compact the powder sample in said powder container; and
   at least one sensor including a load cell configured to measure a load on said powder container, said piston, and the powder sample when said piston compacts the powder sample to facilitate determining a powder quality measurement for the powder sample by comparing the load to a known load for a pedigree powdered build material.

2. The powder quality control system in accordance with claim 1, wherein said at least one sensor further comprises a linear variable displacement transducer configured to measure a distance travelled by said piston when said piston compacts the powder sample.

3. The powder quality control system in accordance with claim 1, wherein said powder container has a cylindrical shape.

4. The powder quality control system in accordance with claim 3, wherein said piston has a cylindrical shape complementary to the cylindrical shape of said powder container.

5. The powder quality control system in accordance with claim 1 further comprising a computing device configured to calculate the powder quality measurement for the powder sample based on the load.

6. The powder quality control system in accordance with claim 1, wherein said load cell is disposed below said powder container.

7. An additive manufacturing system comprising:
   a laser device configured to generate a laser beam;
   a build plate configured to contain a powdered build material, wherein the laser beam is configured to generate a melt pool from the powdered build material; and
   a powder quality control system including a load cell configured to measure a load on a powder container, a piston, and a powder sample to facilitate determining a powder quality measurement for the powdered build material by comparing the load to a known load for a pedigree powdered build material.

8. The additive manufacturing system in accordance with claim 7, wherein said powder quality control system comprises:
   said powder container configured to contain the powder sample of the powdered build material;
   said piston configured to compact the powder sample in said powder container; and
   at least one sensor including said load cell configured to measure the load when said piston compacts the powder sample to facilitate determining the powder quality measurement.

9. The additive manufacturing system in accordance with claim 7 further comprising said powder storage container configured to store the powdered build material and a powder distribution device configured to transport the powdered build material from said powder storage container to at least one of said build plate and said powder quality control system.

10. The additive manufacturing system in accordance with claim 9, wherein said powder storage container comprises a barrel.

11. The additive manufacturing system in accordance with claim 9, wherein said powder distribution device comprises an automated distribution mechanism.

12. The additive manufacturing system in accordance with claim 9, wherein said powder distribution device is configured to transport the powdered build material to said build plate after said powder quality control system determines the powder quality measurement.

13. A method of testing a powdered build material for use in an additive manufacturing system, said method comprising:
   loading a powder sample of the powdered build material into a powder container of a powder quality control system, the powder quality control system including the powder container, a piston, and at least one sensor including a load cell;
   compacting the powder sample with the piston, the piston travelling a predetermined distance;
   measuring, once the piston has travelled the predetermined distance, a load on the powder container, the piston, and the powder sample using the load cell; and
   determining a powder quality measurement for the powder sample based on the load by comparing the load to a known load for a pedigree powdered build material.

14. The method in accordance with claim 13, wherein the at least one sensor further includes a linear variable displacement transducer.

15. The method in accordance with claim 13, wherein measuring the load with the at least one sensor comprises measuring an additional load with the load cell, the additional load including a load on the powder container and the powder sample.

16. The method in accordance with claim 14, wherein measuring the load with the at least one sensor comprises measuring a first distance with the linear variable displacement transducer, the first distance including a distance travelled by the piston during compacting.

* * * * *